United States Patent [19]

Badesha et al.

[11] Patent Number: 4,460,408

[45] Date of Patent: Jul. 17, 1984

[54] PROCESS FOR PREPARATION OF CHALCOGENIDE ALLOYS BY COREDUCTION OF ESTERS

[75] Inventors: Santokh S. Badesha, Ontario; Thomas W. Smith, Penfield, both of N.Y.

[73] Assignee: Xerox Corporation, Stamford, Conn.

[21] Appl. No.: 405,651

[22] Filed: Aug. 5, 1982

[51] Int. Cl.$^3$ .............................................. C01B 19/02
[52] U.S. Cl. .................................... 75/0.5 R; 423/510
[58] Field of Search ............................ 423/510; 75/0.5

[56] References Cited

U.S. PATENT DOCUMENTS

| | | | |
|---|---|---|---|
| 2,481,739 | 9/1949 | Goodman | 175/366 |
| 2,510,361 | 6/1950 | Addink | 175/366 |
| 2,860,954 | 11/1958 | Bueker et al. | 23/209 |
| 2,875,103 | 2/1959 | French | 117/200 |
| 3,723,105 | 3/1973 | Kitajima et al. | 75/134 H |
| 3,954,951 | 5/1976 | Buckley | 423/510 |
| 4,007,255 | 2/1977 | Buckley | 423/510 |
| 4,009,249 | 2/1977 | Buckley | 423/510 |
| 4,015,029 | 3/1977 | Elchisak | 427/76 |
| 4,121,981 | 10/1978 | Ward et al. | 204/38 R |
| 4,175,959 | 11/1979 | Karam et al. | 430/134 |
| 4,389,389 | 6/1983 | Badesha | 423/510 |

*Primary Examiner*—Peter D. Rosenberg
*Attorney, Agent, or Firm*—E. O. Palazzo

[57] ABSTRACT

This invention is generally directed to a process for the preparation of chalcogenide alloys of the elements of Groups VA to VIA of the Periodic Table, in high purity, (99.999 percent) which comprises providing pure esters of the alloys desired, and subsequently simultaneously subjecting the esters to a coreduction reaction. The esters can be obtained by treating the corresponding oxides with an alcohol of diol. Examples of alloys produced in accordance with the process of the present invention include selenium arsenic, selenium sulfur selenium tellurium, selenium tellurium arsenic, selenium sulfur tellurium, and the like.

24 Claims, No Drawings

PROCESS FOR PREPARATION OF CHALCOGENIDE ALLOYS BY COREDUCTION OF ESTERS

BACKGROUND

This invention is generally directed to processes for the preparation of chalcogenide alloys, and more specifically the present invention is directed to the preparation of chalcogenide alloys in high purity by simultaneously coreducing the esters of the metals desired. Accordingly, there is provided in accordance with the present invention a simple, economically attractive, low temperature process for the direct preparation of chalcogenide alloys, which process allows the recycling some of the reactants employed for the preparation of the esters. The resulting chalcogenide alloys are useful for the preparations of imaging members, particularly xerographic photoconductive compositions, for electrostatic imaging systems.

The incorporation of selenium or selenium alloys into xerographic imaging members is well known. These members can be subjected to a uniform electrostatic charge for the purpose of sensitizing the surface of the photoconductive layer, followed by exposure of an image to activating electromagnetic radiation such as light, which selectively dissipates the charge in the illuminated areas of the photoconductive insulating member, wherein a latent electrostatic image is formed in the non-illuminated areas. The resulting image may then be developed and rendered visible by depositing thereon toner particles containing resin particles and pigment particles.

Recently, there has been developed layered organic and inorganic photoresponsive devices containing amorphous selenium, trigonal selenium, amorphous seleniuim alloys, or halogen doped selenium alloys. One such photoresponsive member is comprised of a substrate, a photogenerating layer containing metal phthalocyanine, metal free phthalocyanine, vanadyl phthalocyanine, or selenium tellurium alloys, and a transport layer containing a diamine dispersed in a resinous binder, reference U.S. Pat. No. 4,265,990.

Commercially available selenium or selenium alloys for use in electrostatic imaging systems, including layered organic and inorganic photoresponsive devices are generally substantially pure, that is, for example a purity of 99.999 percent or greater is desired, since the presence of impurities has a tendency to adversely effect the imaging properties of selenium, including the electrical properties thereof, causing copy quality obtained from such devices to be relatively poor in comparison to devices wherein high purity selenium is used.

Many processes are known for the preparation of chalcogenide alloys, particularly selenium containing alloys including, for example, melt blending of the elemental substances such as selenium and arsenic in the proportions desired in the final alloy product. Thus, for example, there is disclosed in U.S. Pat. 3,634,134 the preparation of arsenic-selenium alloys by mixing a master alloy containing the appropropriate proportions of arsenic and selenium. This method not only involves high temperatures, but in most instances, crystalline materials are not obtained. Further, in many instances depending on the process parameters, the desired alloy is not obtained rather, by following this melt blending process, there is obtained an in homogenous mixture of arsenic, selenium, and an arsenic selenium alloy. Additionally, in these processes, there must be selected for evaporation, high purity arsenic and high purity selenium, that is 99.999 percent pure and processes for obtaining high purity arsenic and selenium precursors require high temperature distillations which are not desirable. A similar melt blending method for preparing selenium alloys is disclosed in U.S. Pat. No. 3,911,091.

Also there is disclosed in U.S. Pat. No. 4,007,255 a process for preparing stable red amorphous selenium containing thallium by precipitating selenious acid containing from about 10 parts per million to about 10,000 parts per million of thallium dioxide, with hydrazine from a solution thereof and methanol or ethanol containing not more than about 50 percent by weight of water at a temperature between about −20 degrees Centigrade and the freezing point of the solution wherein the resulting precipitate is maintained at a temperature of from about a −13 degrees Centigrade until to about a −3 degrees Centigrade.

Disclosed in U.S. Pat. No. 3,723,105 is a process for preparing a selenium-tellurium alloy by heating a mixture of selenium and tellurium containing 1 to 25 percent by weight of tellurium to a temperature not lower than 350 degrees Centigrade to melt the mixture, followed by cooling gradually the molten selenium and tellurium to around the melting point of the selenium tellurium alloy at a rate not higher than 100 degrees Centigrade per hour, and subsequently quenching to room temperature with 10 minutes.

Further, there is disclosed in U.S. Pat. No. 4,121,981 the preparation of a selenium alloy by, for example, electrochemically co-depositing selenium and tellurium onto a substrate from a solution of their ions wherein the relative amount of alloy deposited on the cathode is controlled by the concentrations of the selenium and the tellurium in the electrolyte, and by other electrochemical conditions. Once the selenium tellurium layer deposited on the cathode has reached the desired thickness, deposition is discontinued and the cathode is removed.

Additionally there is disclosed in U.S. Pat. No. 3,524,745, the preparation of an arsenic antimony selenium alloy by heating a mixture of these materials at a temperature of 600 degrees Centigrade for a period of several hours in a vacuum, followed by air cooling to room temperature. According to the teachings of this patent, the cooled alloy, depending on the initial composition is completely polycrystalline, a mixture of crystalline and amorphous phases, or completely amorphous.

While these processes as well as others are suitable for their intended purposes, in most instances, they require high temperatures and distillation steps. Further, in some instances, these processes result in selenium alloys which have differing electrical properties, which is believed to be a result of inhomogenities known to exist in non-equilibrium glasses. Further, the prior art processes for preparing alloys do not involve the formation of the esters of the desired elements, or if such esters are formed, they remain in the impure state, and therefore high purity alloys can not be obtained using these esters.

There thus continues to be a need for improved processes for preparing chalcogenide alloys. Additionally, there continues to be a need for an improved simple economically attractive, direct process for the preparation of chalcogenide alloys of high purity. Also, there is a need for improved processes wherein chalcogenide binary and ternary alloys can be obtained in high purity by utilizing substantially similar process parameters and apparatus. Further there continues to be a need for improved processes for the preparation of high purity chalcogenide alloys wherein some of the reactants selected for the preparation of the intermediate alloy esters can be recycled. Additionally, there continues to be a need for improved processes for preparing chalcogenide alloys that are homogeneous, are of a crystalline form, and can be obtained in various proportions without using high temperature reaction conditions. These needs can be satisfied in accordance with the process of the present invention wherein substantially homogenous chalcogenide crystalline alloys were obtained, by the coreduction of a mixture of chalcogenide esters, rather than a mixture of the starting elemental components. In those situations where the rates of reductions of the esters are comparable, a composition of the resulting alloy mirrors or is substantially identical to the molar composition of the mixture of esters. In other situations, when the reduction rates are not comparable, the composition of the alloys, especially with regard to tenary alloys, may not mirror the molar composition of the elements contained in the mixture of esters.

OBJECTS OF THE INVENTION

It is an object of the present invention to provide improved processes for the preparation of chalcogenide alloys which overcomes the above-noted disadvantages.

It is yet another object of the present invention to provide improved processes for the preparation of high purity chalcogenide alloys by simultaneously subjecting the corresponding pure esters to a coreduction reaction.

It is yet a further object of the present invention to provide improved processes for the preparation of high purity chalcogenide binary alloys, and ternary alloys, by subjecting the corresponding pure esters to a coreduction reaction.

Yet another specific object of the present invention is the provision of an improved process for preparing high purity alloys of selenium tellurium, selenium arsenic, selenium antimony, selenium bismuth, selenium-tellurium-arsenic, selenium arsenic bismuth, selenium tellurium antimony, selenium-tellurium-sulfur, selenium-sulfur, selenium-tellurium and the like by the coreduction of a mixture of the corresponding pure esters of the desired elements.

In another object of the present invention there is provided processes for the preparation of high purity chalcogenide alloys, which process is simple, economically attractive, presents no significant environmental pollution problems, can be effected at low temperatures, and results in the production of high yields of alloys.

A further object of the present invention is the provision of improved processes for preparing high purity homogeneous chalcogenide alloys in a crystalline form.

These and other objects of the present invention are accomplished by providing an improved process for the preparation of chalcogenide alloys in high purity, which comprises providing esters of the desired elements, and subsequently subjecting a mixture of the pure esters to a reduction reaction. In one aspect the process of the present invention involves the formation of esters of the desired elements by treating the corresponding oxides with an alcohol or glycol, followed by subjecting a solution of the mixture of resulting esters of high purity to a coreduction reaction. Thus, the oxides of the elements of groups VA and VIA of the Periodic Table are treated with an alcohol, or a diol so as to result in an ester composition which is subsequently purified. For example, the pure selenium ester is obtained by the condensation reaction of selenium dioxide with an alcohol while the corresponding esters of other elements, such as arsenic, antimony, bismuth, and tellurium are usually formed by reacting the corresponding oxides with a glycol, or by the treatment of the oxides with an alcohol, such as methanol, and the corresponding alkoxides, such as sodium methoxide. The selenium ester can also be obtained by reacting the oxides of selenium, with an alcohol, and the corresponding alkoxide. Subsequently, the resulting esters can be purified by distillation, recrystallization, and similar known purification methods.

DESCRIPTION OF PREFERRED EMBODIMENTS

The process of the present invention involves subjecting a mixture of high purity chalcogenide esters to a simultaneous coreduction reaction, in order to obtain an alloy of the desired composition in high purity. The preparation of these esters, which are described in copending applications involve the reaction of the oxides of Groups VA to VIA of the Periodic Table, with an alcohol or a glycol. The resulting mixture of chalcogenide esters subsequent to purification are then subjected to a coreduction reaction utilizing a number of reducing agents, such as hydrazine, sulfur dioxide, thioureas, hydroxylamine and the like.

The selenium ester $(RO)_2SeO$, wherein R is an alkyl group, is prepared as described in copending application No. 404,259 the disclosure of which is totally incorporated herein by reference. In one method of preparation, selenous acid $H_2SeO_3$ is reacted with an alcohol, ROH, wherein R is an alkyl group containing from 1 carbon atom to about 30 carbon atoms, and preferably from 1 carbon atom to about 6 carbon atoms. Water resulting from this reaction can be optionally removed by an azeotropic distillation, to yield the pure liquid diethyl selenite ester $(RO)_2SeO$ after vacuum distillation.

Illustrative examples of alcohols selected for obtaining the desired high purity selenium ester include those as described in the referenced copending application such as methanol, ethanol, propanol, butanol, pentanol, hexanol, and octanol. The preferred alcohols selected for forming the selenium ester include methanol, ethanol, and propanol, More specifically, the selenium ester is obtained by subjecting a crude selenium material, available from Fisher Scientific Company, to an oxidation reaction, by dissolving this material in a strong acid, such as nitric acid. As strong acids, there is selected for the process of the present invention commercially available concentrated nitric acid, commercially available concentrated sulfuric acid, and mixturs thereof. When mixtures of acids are utilized generally from about 20 percent of sulfuric acid and about 80 percent of nitric acid are employed however percentage mixtures can range from between about 5 percent sulfuric acid to about 95 percent nitric acid, and preferably from about 10 percent sulfuric acid to about 90 percent nitric acid. The preferred acid is nitric acid, primarily since it is a stronger oxidizing acid for selenium. Other chemical reagents such as hydrogen peroxide, molecular oxygen, and the like, can also be used to effect this conversion. Generally the crude material is about 98 percent pure, and contains a number of impurities, such as arsenic, bismuth, cadmium, chromium, iron, sodium, magnesium, lead, antimony, tin, silicon, titanium, nickel, lead, thallium, boron, barium, mercury, zinc, other metallic and non-metallic impurities, and the like.

The amount of crude selenium to be dissolved can vary depending for example, on the amount of high purity product desired. Normally from about 1 pound to about 1.5 pounds of crude selenium are dissolved, and preferably from about 1 pound to about 500 grams are dissolved, however it is to be appreciated that substantially any amount of crude selenium can be dissolved if desired.

Generally, the acid used for dissolving the crude selenium product is added thereto in an amount of from about 600 milliliters to about 1,200 milliliters, for each pound of selenium being dissolved, and preferably from about 800 milliliters to about 900 milliliters.

The resulting suspension of selenium and acid are stirred at a sufficient temperature so as to cause complete dissolution of the crude selenium. In one specific embodiment, the suspension is continuously stirred at a temperature of between about 65 degrees Centigrade to about 85 degrees Centigrade for a sufficient period of time to cause complete dissolution of the crude selenium, as noted by the formation of a clear solution. This solution is usually formed in about 1 hour to about 3 hours, however the time can vary significantly depending on the process parameters selected. Thus, for example, very extensive stirring at higher temperatures will result in complete dissolving of the crude selenium in about an hour or less, while low temperatures, less than 30 degrees Centigrade, and slow stirring will not cause the crude selenium to be dissolved until about 3 hours or longer.

Thereafter, the concentrated acid mixture is separated from the resulting clear solution by a number of known methods including distillation at the appropriate temperature, for example 110 degrees Centigrade when nitric acid is being separated. The resulting separated acid can be collected in a suitable container, such as distillation receiver, and subsequently recycled and repeatedly used for dissolving the crude selenium product.

Subsequent to the distillation reaction, and separation of the acid from the solution mixture, there results a white powder, identified as selenous acid $H_2SeO_3$, and other oxides of selenium, such as selenium dioxide. To this powder there is then added an aliphatic alcohol of the formula ROH, wherein R is an alkyl group containing from 1 to about 30 carbon atoms, and preferably from about 1 to about 6 carbon atoms or a diol, causing the formation of a liquid selenium ester. Generally from about 500 milliliters to about 800 milliliters, and preferably from about 600 milliliters to about 700 milliliters of aliphatic alcohol, or diol, are utilized for conversion to the selenium ester, however, other appropriate amounts of alcohol can be selected.

Water formed subsequent to the addition of the aliphatic alcohol or diol, can be removed if desired by an azeotropic distillation process. This is accomplished by boiling the mixture with various azeotropic substances, such as aliphatic and aromatic hydrocarbons including toluene, benzene and pentane. The known azeotropic distillation processes can be effected at temperatures at which the azeotropic agent begins to boil, thus when pentane is used this temperature ranges from about 30 degrees Centigrade to about 35 degrees Centigrade. While it is not necessary to azetropically remove water from the reaction mixture, since the purity of the resulting selenium product will not be adversely affected, it is preferred in the process of the present invention to cause this removal in order, for example, that higher yields of product might be obtained.

The complete removal of water and thus total conversion to the selenium ester is generally accomplished in a period of from about 8 to about 10 hours.

The excess aliphatic alcohol and hydrocarbons, if any, selected for the azeotropic distillation, are then removed by subjecting the resulting reaction mixture to distillation, generally under a vacuum of about 5 millimeters of mercury, and at a temperature of from about 70 degrees Centigrade to about 80 degrees Centigrade. There is then collected, when ethanol is utilized, the pure colorless liquid selenium ester diethyl selenite $(C_2H_5)_2SeO$, as identified by spectroscopic analysis, however, other dialkyl selenite esters can also be obtained with different alcohols.

The tellurium ester is prepared in substantially a similar manner wherein, for example, tellurium oxide is reacted with a cyclic aliphatic or aromatic diol, of the formula $HO(R_n)OH$ wherein R is a cyclic aliphatic ring, or an aromatic ring, or where tellurium oxide is reacted with an aliphatic diol of the formula $(HO(CR_1R_2)nOH$ wherein $R_1$ and $R_2$ are independently selected from the group consisting of hydrogen or alkyl groups containing from 1 carbon atom to about 30 carbon atoms, and preferably from 1 carbon atom to about 6 carbon atoms, and n is a number from about 1 to about 10. This treatment generally involves the use of catalysts such as aromatic or aliphatic sulfonic acids, including a p-toluene sulfonic acid. In one embodiment the process for preparing a pure tellurium ester involves stirring and heating a mixture of tellurium oxide and diol, in the presence of a catalyst for a period of time sufficient so as to result in a clear solution. The resulting crystalline tetraalkoxytellurane tellurium ester is generally identified by spectroscopic and analytical techniques.

Also, the tetraalkoxytelluranes can be prepared by the condensation of tellurium tetrachloride with alkoxides, in the presence of corresponding alcohols, resulting in an ester of the formula $(R_3O)_4Te$ wherein $R_3$ is an alkyl group.

Examples of aliphatic diols selected for reaction with the tellurium oxide are ethylene glycol, 1,2 or 1,3-propane diol, propylene glycol, butylene glycol, 1,2, 1,3, or 1,4-butane diols, analogous hexane diols, and the like, with ethylene glycol being preferred. Examples of aromatic diols include catechol, resorcinol, 1,2-naphthalene diol, 1,3-naphthalene diol, with resorcinol being preferred.

The pure tellurium esters obtained from the condensation reaction of tellurium dioxide with an aliphatic or aromatic diol are generally of the following formula:

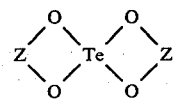

wherein Z is a cyclic or acyclic aliphatic or aromatic group. Accordingly, in those situations where ethylene glycol or resorcinol are selected as the diols for reaction, the resulting pure tetraalkoxy telluranes will be of the following formulas, respectively,

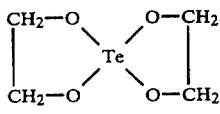

and

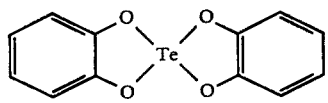

More specifically, preparation of the tellurium esters is accomplished as described in copending application No. 404,257 now U.S. Pat. No. 4,389,389. In one very specific embodiment, a tellurium ester is prepared by initially dissolving commercial grade tellurium in a strong acid, such as concentrated nitric acid, resulting in a solution of tellurium oxides. Subsequently, the resulting oxides are reacted with an appropriate glycol.

As strong acids there can be selected for the process of the present invention commercially available concentrated nitric acid, commercially available concentrated sulfuric acid, and mixtures thereof. When mixtures of acids are utilized, generally from about 20 percent of sulfuric acid and about 80 percent of nitric acid are employed, however percentage mixtures can range from between about 5 percent sulfuric acid to about 95 percent nitric acid, and preferably from about 10 percent of sulfuric acid to about 90 percent of nitric acid. The preferred acid is nitric acid, primarily since it is a strong oxidizing acid for the tellurium.

Generally, the strong acid such as nitric acid used for dissolving the crude tellurium product is added thereto in an amount of from about 600 milliliters to about 1,200 milliliters, for each pound of tellurium being dissolved, and preferably from about 800 milliliters to about 900 milliliters.

The resulting suspension of tellurium and acid are stirred at sufficient temperature so as to cause complete dissolution of the crude tellurium. In one specific embodiment, the suspension is subjected to extensive stirring; and the mixture is heated to a temperature not exceeding 110 degrees Centigrade, for a sufficient period of time until complete dissolution occurs. Generally, the crude tellurium will be completely dissolved in a period ranging from about 6 hours to about 10 hours. The unreacted nitric acid can then be removed from the reaction mixture, by distillation at the boiling point of the acid, or acid mixture, which generally ranges from about 100 degrees Centrigrade to about 110 degrees Centigrade. The separated acid can then be collected in a receiver and recycled for subsequent use in the reaction.

Subsequently, the tellurium oxide obtained is reacted with diol, such as glycol in the presence of a catalyst such as para-toluene sulfonic acid, wherein there results a tetraalkoxytellurane ester. The amount of glycol and catalyst such as para-toluene sulfonic acid selected is dependent on a number of factors including the amount of tellurium oxide formed. Generally, however, from about 1 to about 3 liters of glycol, and from about 5 to about 10 grams of catalyst, such as para-toluene sulfonic acid are used, for each pound of tellurium oxide being treated.

Other catalysts can be selected for assisting in the reaction of the tellurium oxide with the glycol, such catalysts including aliphatic and aromatic sulfonic acids, other than para-toluene sulfonic acid, mineral acids, such as sulfuric acid, acetic acid, hydrochloric acid, and the like. Additionally, other similar equivalent catalysts can be utilized providing the objectives of the present invention are achieved.

Thereafter, the tetralkoxy tellurane esters are separated as solids, which can be purified by recrystallization, or as liquids, wherein purification is accomplished by distillation. The isolated pure ester is then subjected to a low temperature reduction reaction as described hereinafter.

As an optional step in the process, any water formed by the reaction of the tellurium oxides with the glycol can be azeotropically removed by distillation employing various aliphatic and aromatic azeotropic agents such as pentane, cyclohexane, toluene and benzene. The temperature of the azeotropic reaction will vary depending on the azeotropic material selected, thus for toluene, the azeotropic distillation is accomplished at a temperature of from 34 degrees Centigrade to about 95 degrees Centigrade, while for benzene the temperature used is from about 60 degrees Centigrade to about 68 degrees Centigrade. Generally, complete removal of water occurs in about 8 to about 10 hours, thus allowing substantially complete conversion of the tellurium oxide to the corresponding tellurium ester, tetraalkoxytellurane Te(OCH$_2$CH$_2$O)$_2$. It is not necessary to remove water from the reaction mixture since the purity of the resulting tellurium substance will not be adversely affected, however, it is believed that higher yields of tellurium will be obtained with the removal of water, although this may not necessarily the situation under all reaction conditions.

The high purity arsenic ester can be prepared in substantially the same manner described herein with regard to the preparation of the tellurium ester. Thus, for example, the arsenic ester, bis(arsenic triglycollate) of the formula

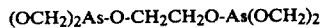

can be prepared by treating arsenic oxide (AS$_2$O$_3$), with ethylene glycol in the presence of a catalyst such as p-toluene sulfonic acid. Other arsenic esters may also be selected for the process of the present invention including arsenic alkoxides of the general formula As(OR)$_3$ wherein R is as defined herein. The arsenic alkoxides are generally prepared by reacting arsenic trichloride with sodium alkoxides in the presence of the corresponding alcohols. For example, such a reaction is illustrated by the following equation:

The resulting arsenic esters are soluble in organic solvents such as cellosolve and thus can be easily coreduced to metallic arsenic with a reducing agent such as hydrazine.

Similarly, the corresponding sulfur ester dialkyl sulfite which is commercially available can be prepared by the reaction of thionyl chloride with an alcohol. For example, dimethyl sulfite, can be prepared by the condensation reaction of thionyl chloride with methanol in accordance with the following equation:

$$SOCl_2 + CH_3OH \rightarrow (CH_3O)_2SO$$

Other esters of the elements of the Periodic Table of Groups VA and VIA, which esters can be coreduced in accordance with the process of the present invention are generally prepared by the condensation of the corresponding oxides or chlorides, with aliphatic and aromatic alcohols and diols.

Depending on the composition of the alloy desired and whether a binary or ternary alloy is to be formed, the corresponding esters, subsequent to purification, are subjected to a coreduction reaction. By coreduction in accordance with the process of the present invention is meant that the appropriate pure esters of the desired elements are simultaneously reduced by optionally dissolving these esters in a suitable organic solvent, followed by the addition of a common reducing agent. Examples of reducing agents that may be selected include sulfur dioxide, hydrazine, ureas, thioureas, hydroxylamine, glyoxal, phosphites, and phosphonites, with hydrazine being preferred.

In one illustrative reduction sequence, the hydrazine is added dropwise to the mixture of pure esters until conversion to the chalcogenide alloys is completed as evidenced by ceassation of bubbling or emission of nitrogen gas from the reaction mixture.

The resulting chalcogenide alloy can then be filtered from the reaction mixture, washed with suitable solvent such as water or cellosolve. Subsequently the alloy is allowed to dry. There results alloys of 99.999 percent purity subsequent to completion of the reduction reaction as determined by Emission Spectroscopy. Thus, for example, a binary alloy of selenium tellurium, conatining a ratio of 4 parts of selenium to 1 parts of tellurium, prepared in accordance with the process of the present invention, contain 0.3 parts per million (ppm) of silver, 0.2 parts per million of copper, 5 parts per million of iron, 3 parts per million of magnesium, 3 parts per million of silicone, undetectable amounts of aluminum, arsenic, boron, barium, bismuth, calcium, cadmium, cobalt, chromium, mercury, sodium, manganese, molibdium, nickel, lead, antimony, tin, titanium, thallium, and zinc, with the remainder of the composition being selenium and tellurium as determined by Emission Spectroscopy. It is believed that impurities such as silicon, (Si), magnesium (Mg), and iron (Fe), result from the glassware and stainless steel selected for the process described.

More specifically, the reduction reactions are accomplished as described in copending applications identified herein, the disclosure of each application being totally incorporated by reference. Thus, the reduction reaction can be accomplished at various suitable temperatures, dependent on, for example, the reducing agent selected and the solvent system used. Generally, the reduction reaction is accomplished at relatively low, not exceeding about 100 degrees Centigrade. Specifically, reduction reaction temperature can range from about 25 degrees Centigrade to about 100 degrees Centigrade, depending, for example, on the reducing agent being employed.

The amount of reducing agent needed is dependent on a number of factors, such as its chemical composition, reaction temperatures, concentration of reactants employed, and the like. Thus, for example, hydrazine is usually added in an equimolar quantity until completion of the reduction reaction, while the sulfur dioxide is generally bubbled through the solution of the esters involved for a period of time to cause complete precipitation of the chalcogenide alloys.

In accordance with the process of the present invention, a selenium tellurium alloy can be prepared by the coreduction of the corresponding pure selenium and tellurium esters with hydrazine as follows:

$$(RO)_2SeO + (R'O)_4Te + H_4N_2 \longrightarrow \quad \text{I.}$$
$$(1-x) \text{ moles} \quad x \text{ moles}$$

$$Se_{1-x}Te_x + ROH + R'OH + N_2 \uparrow$$

wherein R is as defined herein, R' is an aliphatic group containing from 1 carbon atom to about 30 carbon atoms and preferably from 1 carbon atom to about 6 carbon atoms, including methyl, ethyl, propyl, butyl, heptyl, hexyl, octyl, decyl, nonyl and the like, and x is a number ranging from about 0.1 to about 0.99. Thus, there can be prepared selenium tellurium alloys containing from about 99 to about 1 percent selenium, and from about 1 percent to about 99 percent by weight of tellurium. Preferred alloys prepared include those compositions wherein selenium is present in an amount of from about 10 to 90 percent and tellurium is present in an amount of from about 90 to 10 percent. The percentage of selenium tellurium contained in the alloy depends primarily on the amount of tellurium and selenium esters employed, such percentages corresponding substantially to the percentages of selenium and tellurium contained in the esters. Thus, for example, should a selenium tellurium alloy be desired containing 95 percent of selenium and 5 percent of tellurium, there is employed 95 moles of the pure selenium ester, and 5 moles of the pure tellurium ester.

Similarly, other selenium alloys are prepared in accordance with the process of the present invention as illustrated in the following reaction sequences, it being noted that the arsenic ester bis(arsenic triglycolate) in these illustrative reactions was formed by the condensation of arsenic oxide $As_2O_3$ with ethylene glycol in the presence of a catalyst such as p-toluene sulfonic acid.

$$(OCH_2)_2As.OCH_2CH_2O.As(OCH_2)_2 + (RO)_2SeO + H_4N_2 \longrightarrow \quad \text{II.}$$
$$x \text{ moles} \qquad\qquad 1-x \text{ moles}$$

$$Se_{1-x}As_x + ROH + N_2 \uparrow + HOCH_2CH_2OH$$

$$(OCH_2)_2As.OCH_2CH_2.OAs(OCH_2)_2 + (RO)_2SeO + \quad \text{III.}$$
$$y \text{ moles} \qquad\qquad 1-(x+y) \text{ moles}$$

$$(R'O)_4Te + H_4N_2 \longrightarrow Se_{1-(x+y)}Te_xAs_y + R'OH + ROH +$$
$$x \text{ moles}$$

$$N_2 \uparrow + HOCH_2CH_2OH$$

wherein x is a number of from 0.5 to 0.95 and y is a number of from 0.5 to 0.95

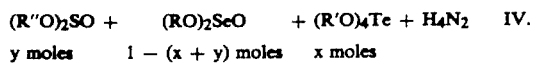

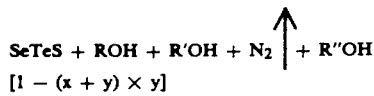

wherein x is from about 0.5 to 0.95, and y is from about 0.5 to about 0.95.

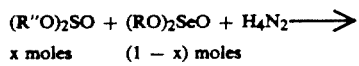

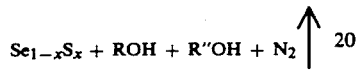

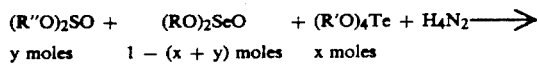

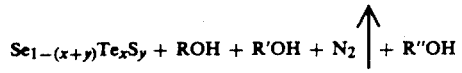

wherein x is from about 0.1 to about 0.9 and y is from about 0.9 to about 0.1.

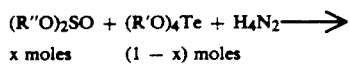

Unlike the selenium tellurium alloys, the arsenic and sulfur containing alloys, for example, do not mirror the composition of the pure ester mixture used for formation of such alloys when, for example, hydrazine or sulfur dioxide are selected as the reducing agents, thus apparently the arsenic and selenium esters are reduced at a different rate in comparison to the rate of reduction of the esters of selenium and tellurium.

Specific illustrative examples of alloys prepared in accordance with the process of the present invention include $Se_{90}Te_{10}$; $Se_{80}Te_{20}$; $Se_{75}Te_{25}$; $Se_{70}Te_{30}$; $Se_{60}Te_{40}$; $Se_{50}Te_{50}$; $Se_{40}Te_{60}$; $Se_{30}Te_{70}$; $Se_{25}Te_{75}$; $Se_{98.5}As_{1.5}$; $Se_{97.4}As_{2.6}$; $Se_{99.2}S_{0.8}$; $Se_{94.6}S_{5.4}$; $Te_{98.7}S_{1.3}$; $Te_{84.7}S_{15.3}$; $Se_{79.26}Te_{20.74}$ and the like; as well as ternary alloys such as $Se_{89.8}Te_{9.3}As_{0.9}$, and the like.

The alloys prepared in accordance with the process of the present invention were substantially pure, crystalline and fairly homogeneous as determined by Emission Spectroscopy, scanning electron microscopy (SEM), energy dispersive X-ray analysis (EDXA), X-ray defraction (XRD), and differential scanning calorimetry (DSC).

The alloys prepared in accordance with the process of the present invention can be formulated into imaging members by, for example, depositing such alloys on a suitable conductive substrate such as aluminum. The resulting imaging or photoconductive member can then be incorporated into an electrostatographic imaging system such as a xerographic imaging system wherein the imaging member is charged to a suitable polarity, followed by developing the resulting latent image with a toner composition comprised of resin particles and pigment particles, followed by transferring the developed image to a suitable substrate such as paper, and optionally permanently affixing the image thereto. Furthermore, the alloys prepared in accordance with the process of the present invention can be utilized in layered photoresponsive devices as the generating layer. Such devices usually consist of a conductive substrate, a generating layer, and a transport layer, reference U.S. Pat. No. 4,265,990, the disclosure of which is totally incorporated herein by reference.

The following examples specifically defining preferred embodiments of the present invention are now provided, which examples are not intended to limit the scope of the present invention, it being noted that various alternative parameters which are not specifically mentioned are included within the scope of the present invention. Parts and percentages are by weight unless otherwise indicated.

EXAMPLE I

This example describes the preparation of tetraalkoxytellurane by the condensation of tellurium dioxide with ethylene glycol.

A mixture of commercial grade tellurium dioxide 160 grams, p-toluenesulfonic acid 5 grams, and ethylene glycol 1600 milliliters (ml) were charged into a 2-liter round bottom (RB) flask equipped with a reflux condenser. The contents of the flask were heated and stirred under an argon atmosphere at 120 degrees Centigrade for 3 hours, and then at 160 degrees Centigrade until a clear solution was obtained. This solution was then cooled to room temperature, and allowed to stand on a bench for 5 hours, resulting in the formation of a precipitate of white needles. This precipitate was separated from the mixture by filtration, washed with 100 milliliters (2×50 ml) of cellosolve. These white needles were further purified by recrystallization from a cellosolve solution. The resultant solid, which was obtained in 86 percent yield, was identified as the tellurium ester tetraalkoxytellurane by known spectroscopic and analytical techniques.

An additional amount of tetraalkoxytellurane can be obtained by concentrating the filtrate resulting from the above-separation processes.

EXAMPLE II

This example describes the conversion of selenium dioxide into dimethyl selenite.

A mixture of selenium dioxide 50 grams, p-toluene sulfonic acid 5 grams in 500 ml of methanol was charged to a 1-liter round bottom (RB) flask fitted with a Dean-Stark apparatus. The reaction mixture was refluxed and stirred on a magnetic stirrer for 5 hours, during which time a clear solution results. Chloroform, 200 ml, was then added to the reaction flask and water removed azeotropically. This reaction was completed in approximately 6 hours. Excess methanol and chloroform were removed by distillation and the residue remaining in the flask was distilled under high vacuum. Pure dimethyl selenite, 60 grams, 85 percent yield, which distills at 43 degrees Centigrade/5 mm of mercury was collected, and identified by spectroscopic and analytical analysis.

EXAMPLE III

This example describes the preparation of bis(arsenic triglycollate) by the condensation of arsenic (III) oxide with ethylene glycol.

A mixture of arsenic (III) oxide 10 grams, p-toluene sulfonic acid 0.1 grams and ethylene glycol 30 ml was charged to a 100 milliliter round bottom (RB) flask fitted with a reflux condenser. The mixture was stirred at 65 degrees Centigrade on a magnetic stirrer under argon atmosphere. A clear solution was obtained in approximately one hour. The resulting solution was then subjected to high vacuum distillation and the fraction distilling at 140–145 degrees Centigrade/0.5 mm of mercury was collected. The resulting pure clear liquid, 95 grams, 57 percent yield was identified as bis(arsenic triglycollate) by spectroscopic and analytical analysis.

EXAMPLE IV

This example describes the preparation of selenium-tellurium alloys by the coreduction of dimethyl selenite and tetraalkoxytellurane with hydrazine in an organic media. The composition of the pure ester reactants mirrors the composition of the final alloy, thus experiments can be designed to prepare selenium tellurium alloys of any specific composition.

Tetraalkoxytellurane, 0.050 grams, 0.0002 mole prepared in accordance with Example I, was dissolved in 25 milliliters of cellosolve in a 100 milliliter Erlenmeyer flask by stirring and warming on a magnetic stirrer. Dimethyl selenite 0.12 grams, 0.0008 mole, prepared in accordance with Example II was then added to the above solution. These mixtures of esters were stirred for 10 minutes to ensure complete mixing. A solution of 2.0 grams of hydrazine in 15 milliliters of cellosolve was then added dropwise to the mixture of esters. The reaction was exothermic and $N_2$ gas was evolved during the addition. The resulting black slurry was further stirred for 15 minutes, cooled to room temperature and filtered. The black powder was washed with 30 milliliters ($3 \times 10$ ml) of cellosolve, dried and weighed. There was obtained 0.089 grams of the crystalline and fairly homogeneous alloy $Se_{79}Te_{21}$, as determined by spectroscopic analysis.

EXAMPLE V

This example describes the preparation of selenium arsenic alloys by the coreduction of a mixture of dimethyl selenite and bis(arsenic triglycollate) in an organic media. As the dimethyl selenite and bis(arsenic triglycollate) reduce at different rates, the composition of the final alloy does not mirror the composition of the pure ester reactants.

A solution of pure dimethyl selenite, 1.413 grams, 0.009 moles, prepared in accordance with Example II, and pure bis(arsenic triglycollate), 0.195 grams, 0.00059 moles prepared in accordance with Example III, in 20 milliliters of cellosolve was charged into a 100 milliliter Erlenmeyer flask. The contents of the flask were stirred and warmed to 50 degrees Centigrade on a magnetic stirrer. A solution of 3 milliliters of hydrazine in 10 milliliters of cellosolve was added dropwise to the above solution. The reaction was exothermic and $N_2$ gas was evolved. The addition involved approximately 10 minutes, and the resulting black slurry was further stirred for 20 minutes. The resulting black precipitate was collected by filtration, washed with 30 milliliters ($3 \times 10$ ml) cellosolve, dried and weighed. There resulted 0.731 grams of the crystalline and fairly homogeneous alloy $Se_{97.4}Te_{2.6}$, as determined by spectroscopic analysis.

EXAMPLE VI

This example describes the preparation of a selenium sulfur alloy by the coreduction of dimethyl selenite and dimethyl sulfite, with hydroquine in an organic media. The composition of the the final alloy, does not mirror the composition of dimethyl sulfite.

A solution of dimethyl selenite prepared in accordance with Example II, 0.785 grams, 0.005 moles and pure dimethyl sulfite 0.22 grams, 0.002 moles in 50 milliliters cellosolve was charged into a 250 milliliter Erlenmeyer flask. The contents of the flask were stirred for 5 minutes and a solution of 2 milliliters of hydrazine in 10 milliliters of cellosolve was added dropwise. The resulting black slurry was further stirred for another 30 minutes and filtered. The black precipitate collected by filtration was washed with cellusolve and dried as in Example I. There resulted 0.4 grams of the crystalline and fairly homogeneous alloy composition of $Se_{98}S_2$, as identified by spectroscopic analysis.

EXAMPLE VII

This example describes the preparation of a tellurium sulfur alloy by the coreduction of a mixture of tetraalkoxytellurane and dimethyl sulfite. The composition of the the final alloy, does not mirror the composition of dimethy sulfite.

A mixture of tetraalkoxytellurane 0.250 grams, 0.001 moles prepared in accordance with Example I, and pure dimethyl sulfite 0.275 grams, 0.0025 moles, was dissolved in 100 milliliters of cellosolve by stirring and warming on a magnetic stirrer. A solution of 2 milliliters of hydrazine in 10 milliliters of cellosolve was added dropwise. The reaction was exothemic and $N_2$ gas was evolved. The resulting black slurry was then stirred for 20 minutes and filtered. The black precipitate was washed with cellosolve and dried as described in Example VI. There resulted 0.155 grams of the alloy $Te_{74.5}$, $S_{25.5}$ as identified by spectroscopic analysis.

EXAMPLE VIII

This example describes the preparation of a selenium, tellurium, arsenic alloy. To prepare this tertiary alloy, a mixture of dimethyl selenite, tetraalkoxytellurane and bis(arsenic triglycollate) were coreduced with hydrazine in an organic media. The final alloy composition obtained does not mirror the composition of arsenic contained in the arsenic ester reaction, since this ester is reduced at a different than the tellurium and selenium esters.

A mixture of tetraalkoxytellurane 0.250 grams, 0.001 mole, prepared in accordance with Example I, dimethyl selenite, 1.256 grams, 0.008 mole, prepared in accordance with Example II, bis(arsenic triglycollate) prepared in accordance with Example III, 0.195 grams, 0.00059 moles, and 60 milliliters of cellosolve was charged to a 100 Erlenmeyer flask. The contents of the flask were stirred and heated at 50 degrees Centigrade on a magnetic stirrer for 10 minutes during which time a clear solution was obtained. A solution of 2 milliliters of hydrazine in 10 milliliters was added dropwise over a period of 10 minutes. The reaction was exothermic and $N_2$ gas was evolved. The resulting black slurry was stirred for another 20 minutes and then filtered. The black precipitate was collected, washed with 30 milliliters (3×10 ml) cellosolve, and dried. There resulted 0.89 grams of the crystalline and fairly homogeneous alloy $Se_{89.8} T_{9.3}, As_{0.9}$ as identified by spectroscopic analysis

EXAMPLE IX

The selenium alloys prepared in accordance with the above processes were then formulated into imaging members by the vapor deposition of the respective alloy in a thickness of about 50—60 microns on an aluminum substrate with a thickness of about 2,000 to 3,000 microns. These devices were then incorporated into electrostatographic imaging apparatus wherein a positive latent electrostatic latent image is formed on the photoconductive device. The images are then developed with a toner composition comprised of a styrene n-butylmethacrylate copolymer resin, 90 percent by weight and 10 percent by weight of carbon black. There results in each instance excellent quality images of high resolution for over 100 copying cycles.

Other modifications of the present invention will occur to those skilled in the art based upon a reading of the disclosure of the present application and these modifications are intended to be included within the scope of the present invention.

We claim:

1. A process for the preparation of chalcogenide alloys in high purity which comprises providing pure esters of the desired chalcogenide, and subsequently subjecting the mixture of esters to a coreduction reaction.

2. A process in accordance with claim 1 wherein a mixture of the pure esters of selenium and tellurium are subjected to a coreduction reaction.

3. A process in accordance with claim 1 wherein a mixture of the pure esters of selenium and arsenic are subjected to a coreduction reaction.

4. A process in accordance with claim 1 wherein a mixture of the pure esters of selenium, tellurium and arsenic are subjected to a coreduction reaction.

5. A process in accordance with claim 1 wherein a mixture of the pure esters of selenium, tellurium, and sulfur are subjected to a coreduction reaction.

6. A process in accordance with claim 2 wherein the selenium ester is of the formula $(RO)_2SeO$, the tellurium ester is of the formula $(RO)_4Te$, or

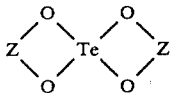

the arsenic ester is of the formula $(OCH_2)_2As\text{-}CH_2CH_2OAs(OCH_2)_2$, and the sulfur ester is of the formula $(RO)_2SO$, wherein R is an alkyl group, and Z is an aliphatic or aromatic moiety.

7. A process in accordance with claim 1 wherein the reducing agent is hydrazine or sulfur dioxide.

8. A process in accordance with claim 1 wherein the desired esters are obtained by reacting the corresponding metal oxides, with the materials selected from glycols or alcohols, or by reacting metallic chlorides, with alcohols, in the presence of alkoxides corresponding to the alcohols.

9. A process in accordance with claim 5 wherein the tellurium and arsenic esters are obtained by the condensation of the corresponding oxides with a diol.

10. A process in accordance with claim 1 wherein the selenium esters are obtained by reacting selenous acid or selenium oxide with an alcohol.

11. A process in accordance with claim 1 wherein there results a selenium arsenic alloy.

12. A process in accordance with claim 1 wherein there results a selenium tellurium arsenic alloy.

13. A process in accordance with claim 1 wherein there results a selenium sulfur alloy.

14. A process in accordance with claim 1 wherein there results a selenium, tellurium, sulfur alloy.

15. A process in accordance with claim 1 wherein there results a tellurium sulfur alloy.

16. A process in accordance with claim 1 wherein there results a selenium sulfur tellurium arsenic alloy.

17. A process in accordance with claim 1 wherein there results a selenium arsenic alloy of the formula $$Se_{1-x}As_x$$

wherein x is a number ranging from about 0.1 to about 0.99.

18. A process in accordance with claim 19 wherein there results a selenium arsenic alloy contains 99.95 percent selenium, and 0.5 percent arsenic.

19. A process in accordance with claim 1 wherein the reduction reaction is accomplished at a temperature ranging from about 25 degrees Centigrade to about 100 degrees Centigrade.

20. A process in accordance with claim 9 wherein the diol is ethylene glycol.

21. A process in accordance with claim 10 wherein the alcohol is methanol or ethanol.

22. A process in accordance with claim 17, wherein there results a selenium arsenic alloy containing about 95 percent by weight of selenium, and about 5 percent by weight of arsenic.

23. A process in accordance with claim 1, wherein there results a selenium tellurium alloy.

24. A process in accordance with claim 23 wherein the alloy contains from about 70 percent by weight to about 90 percent by weight of selenium, and from about 10 percent by weight to about 30 percent by weight of tellurium.

* * * * *